United States Patent
Borran et al.

(10) Patent No.: US 8,892,108 B2
(45) Date of Patent: Nov. 18, 2014

(54) CONTROL CHANNEL CONSTRAINTS IN WIRELESS COMMUNICATIONS

(75) Inventors: Mohammad Jaber Borran, San Diego, CA (US); Alexei Gorokhov, San Diego, CA (US); Aamod Khandekar, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 1387 days.

(21) Appl. No.: 12/021,930

(22) Filed: Jan. 29, 2008

(65) Prior Publication Data

US 2008/0188233 A1 Aug. 7, 2008

Related U.S. Application Data

(60) Provisional application No. 60/887,342, filed on Jan. 30, 2007.

(51) Int. Cl.
| | |
|---|---|
| H04W 4/00 | (2009.01) |
| H04W 72/00 | (2009.01) |
| H04J 3/16 | (2006.01) |
| H04B 7/06 | (2006.01) |
| H04B 7/04 | (2006.01) |
| H04W 24/10 | (2009.01) |
| H04W 52/24 | (2009.01) |

(52) U.S. Cl.
CPC ............. *H04W 24/10* (2013.01); *H04B 7/066* (2013.01); *H04B 7/0417* (2013.01); *H04W 52/246* (2013.01); *H04B 7/0632* (2013.01)
USPC .......................... 455/452.1; 370/329; 370/437

(58) Field of Classification Search
CPC .... H04B 7/0417; H04B 7/0632; H04B 7/066; H04W 24/10; H04W 52/246
USPC ............... 455/452.1, 436, 439, 425; 370/342, 370/310, 329, 437
See application file for complete search history.

(56) References Cited

U.S. PATENT DOCUMENTS

| | | | |
|---|---|---|---|
| 5,936,965 | A | 8/1999 | Doshi et al. |
| 6,144,653 | A | 11/2000 | Persson et al. |

(Continued)

FOREIGN PATENT DOCUMENTS

| | | |
|---|---|---|
| CN | 1662097 A | 8/2005 |
| EP | 0994604 | 4/2000 |

(Continued)

OTHER PUBLICATIONS

International Search Report—PCT/US2008/052532—International Search Authority—European Patent Office—Aug. 26, 2008.

(Continued)

*Primary Examiner* — Opiribo Georgewill
(74) *Attorney, Agent, or Firm* — François A. Pelaez

(57) ABSTRACT

Systems and methodologies are described that facilitate defining control channels and resource identifiers related thereto as well as constraints for utilizing the control channels. A minimum number of required control reports for a set of resource indices can be specified as a constraint to provide a mobile device flexibility with respect to transmitting the control reports over available resource indices. Additionally, or alternatively, a maximum number of control reports can be specified for transmitted over the resource indices to prevent control channel overload. Moreover, a constraint can specify an exact number of control channels to utilize in transmitting control reports. Other constraints are possible as well, such as limiting a control report payload or change in payload, limiting out-of-band control reports based on in-band reports transmitted, etc.

41 Claims, 11 Drawing Sheets

(56) References Cited

U.S. PATENT DOCUMENTS

| | | |
|---|---|---|
| 6,934,752 B1 | 8/2005 | Gubbi |
| 7,039,032 B1 | 5/2006 | Ho et al. |
| 7,069,033 B1 | 6/2006 | Moon et al. |
| 7,298,724 B2 | 11/2007 | Lin et al. |
| 2003/0185181 A1 | 10/2003 | Balachandran et al. |
| 2004/0008726 A1 | 1/2004 | Kelly et al. |
| 2005/0041673 A1 | 2/2005 | Jiang et al. |
| 2005/0111462 A1 | 5/2005 | Walton et al. |
| 2006/0092963 A1 | 5/2006 | Bakre et al. |
| 2006/0111104 A1 | 5/2006 | Hyslop |
| 2006/0268786 A1 | 11/2006 | Das et al. |
| 2006/0285515 A1 | 12/2006 | Julian et al. |
| 2007/0036176 A1 | 2/2007 | Quigley et al. |
| 2007/0171849 A1* | 7/2007 | Zhang et al. ............ 370/310 |
| 2007/0249360 A1 | 10/2007 | Das et al. |
| 2007/0253449 A1 | 11/2007 | Das et al. |
| 2008/0080469 A1* | 4/2008 | Kolding et al. ......... 370/342 |
| 2008/0165698 A1* | 7/2008 | Dalsgaard et al. ...... 370/252 |
| 2008/0182609 A1* | 7/2008 | Somasundaram et al. .... 455/522 |
| 2008/0186931 A1 | 8/2008 | Prakash et al. |

FOREIGN PATENT DOCUMENTS

| | | |
|---|---|---|
| EP | 1072102 A1 | 1/2001 |
| EP | 1164714 | 12/2001 |
| EP | 1223776 | 7/2002 |
| EP | 1569492 A2 | 8/2005 |
| GB | 2414901 | 12/2005 |
| JP | 2003198654 A | 7/2003 |
| RU | 2198466 C2 | 2/2003 |
| RU | 2288538 | 11/2006 |
| WO | WO0048327 | 8/2000 |
| WO | 0076233 | 12/2000 |
| WO | 0163849 | 8/2001 |
| WO | WO02093782 A1 | 11/2002 |
| WO | 2004043101 | 5/2004 |
| WO | 2004075468 | 9/2004 |
| WO | 2005032185 | 4/2005 |
| WO | 2006112292 | 10/2006 |
| WO | 2006138339 | 12/2006 |

OTHER PUBLICATIONS

Written Opinion—PCT/US2008/052532—International Search Authority—European Patent Office—Aug. 26, 2008.

Partial International Search Report—PCT/US20081052532—International Search Authority—European Patent Office—Jun. 25, 2008.

Taiwan Search Report—TW097103834—TIPO—Feb. 9, 2012.

\* cited by examiner

CONTROL CHANNEL CONSTRAINTS IN WIRELESS COMMUNICATIONS

CROSS-REFERENCE TO RELATED APPLICATIONS

This application claims the benefit of U.S. Provisional Patent application Ser. No. 60/887,342 entitled "A METHOD AND APPARATUS FOR USING A REVERSE CONTROL CHANNEL MAC PROTOCOL" which was filed Jan. 30, 2007. The entirety of the aforementioned application is herein incorporated by reference.

BACKGROUND

I. Field

The following description relates generally to wireless communications, and more particularly to reverse link control channels.

II. Background

Wireless communication systems are widely deployed to provide various types of communication content such as, for example, voice, data, and so on. Typical wireless communication systems may be multiple-access systems capable of supporting communication with multiple users by sharing available system resources (e.g. bandwidth, transmit power, . . . ). Examples of such multiple-access systems may include code division multiple access (CDMA) systems, time division multiple access (TDMA) systems, frequency division multiple access (FDMA) systems, orthogonal frequency division multiple access (OFDMA) systems, and the like. Additionally, the systems can conform to specifications such as third generation partnership project (3GPP), etc.

Generally, wireless multiple-access communication systems may simultaneously support communication for multiple mobile devices. Each mobile device may communicate with one or more base stations via transmissions on forward and reverse links. The forward link (or downlink) refers to the communication link from base stations to mobile devices, and the reverse link (or uplink) refers to the communication link from mobile devices to base stations. Further, communications between mobile devices and base stations may be established via single-input single-output (SISO) systems, multiple-input single-output (MISO) systems, multiple-input multiple-output (MIMO) systems, and so forth. In addition, mobile devices can communicate with other mobile devices (and/or base stations with other base stations) in peer-to-peer wireless network configurations.

MIMO systems commonly employ multiple ($N_T$) transmit antennas and multiple ($N_R$) receive antennas for data transmission. The antennae can relate to both base stations and mobile devices, in one example, allowing bi-directional communication between the devices on the wireless network. To communicate data regarding transmission quality (e.g., control data), the devices and/or base stations can utilize portions of bandwidth separated as logical control channels. The logical control channels can provide opportunities within one or more time periods to transmit the control/quality data, and one or more devices can be assigned a number of resource indices indicative of the different control channels that can be used to send the control data.

SUMMARY

The following presents a simplified summary of one or more embodiments in order to provide a basic understanding of such embodiments. This summary is not an extensive overview of all contemplated embodiments, and is intended to neither identify key or critical elements of all embodiments nor delineate the scope of any or all embodiments. Its sole purpose is to present some concepts of one or more embodiments in a simplified form as a prelude to the more detailed description that is presented later.

In accordance with one or more embodiments and corresponding disclosure thereof, various aspects are described in connection with facilitating defining and utilizing one or more constraints on control channels to provide disparate functionalities in a wireless communications network. For example, a minimum number of control reports constraint can be specified for utilizing the control channels to ensure devices transmit sufficient control information, but also to leave the ultimate flexibility with the devices as to when to transmit the control data. Moreover, a maximum or exact number of reports can be specified as a constraint along with others, such as a minimum allowed payload change, specific requirements for transmitting control data over definite resource indices, and/or limiting out-of-band control data transmissions based at least in part on in-band control data transmissions.

According to related aspects, a method for specifying constraints on one or more control channels in a wireless communications network is provided. The method can include defining one or more control channels on a portion of bandwidth. Moreover, the method can comprise specifying a constraint related to a minimum number of control reports to be transmitted over the control channels for a device over the portion of bandwidth to promote flexibility for the device in transmitting the control reports and transmitting the constraint to the device.

Another aspect relates to a wireless communications apparatus. The wireless communications apparatus can include at least one processor configured to define one or more constraints related to a plurality of control channels in a portion of bandwidth, at least one of the constraints specifies a maximum number of control reports to transmit over the control channels for a type of control data. The wireless communications apparatus can also include a memory coupled to the at least one processor.

Yet another aspect relates to a wireless communications apparatus that specifies one or more constraints for a plurality of control channels. The wireless communications apparatus can include means for assigning resource indices to a plurality of control channels. The wireless communications apparatus can also include means for defining one or more constraints on the control channels, at least one constraint relates to a number of control reports to transmit over the resource indices for a device as well as means for transmitting the resource indices and the constraints to the device.

Still another aspect relates to a computer program product, which can have a computer-readable medium including code for causing at least one computer to define one or more control channels on a portion of bandwidth. The computer-readable medium can further include code for causing the at least one computer to specify a constraint related to a minimum number of control reports to be transmitted over the control channels for a device over the portion of bandwidth to promote flexibility for the device in transmitting the control reports and code for causing the at least one computer to transmit the constraint to the device.

In accordance with another aspect, an apparatus in a wireless communication system can include a processor configured to assign resource indices to a plurality of control channels and define one or more constraints on the control channels, at least one constraint relates to a number of control reports to transmit over the control channels for a device. The processor can also be configured to transmit the resource indices and the constraints to the device. Also, the apparatus can include a memory coupled to the processor.

According to a further aspect, a method for transmitting control reports over control channels in a wireless communications network is provided. The method can comprise receiving resource indices related to one or more control channels. The method can furthermore include receiving one or more constraints related to utilizing the resource indices, at least one of the constraints is related to imposing a minimum number of control reports to be transmitted using the resource indices and transmitting one or more control reports according to the constraints.

Another aspect relates to a wireless communications apparatus. The wireless communications apparatus can include at least one processor configured to receive resource indices that identify one or more control channels over a portion of bandwidth and constraints for using the control channels, at least one constraint relates to a maximum number of control reports that can be sent on the control channels. The wireless communications apparatus can also include a memory coupled to the at least one processor.

Yet another aspect relates to a wireless communications apparatus for transmitting control data according to one or more constraints. The wireless communications apparatus can comprise means for receiving resource indices related to a plurality of control channels as well as means for receiving one or more constraints associated with the control channels, at least one constraint relates to a minimum number of control reports that can be transmitted by the wireless communications apparatus over the resource indices for a control data type. The wireless communications apparatus can further comprise means for transmitting control reports on the control channels according to the constraints.

Still another aspect relates to a computer program product, which can have a computer-readable medium including code for causing at least one computer to receive resource indices related to one or more control channels as well as code for causing the at least one computer to receive one or more constraints related to utilizing the resource indices, at least one of the constraints is related to imposing a minimum number of control reports to be transmitted using the resource indices. The computer-readable medium can further comprise code for causing the at least one computer to transmit one or more control reports according to the constraints.

In accordance with another aspect, an apparatus can be provided in a wireless communication system including a processor configured to receive resource indices related to a plurality of control channels, receive one or more constraints associated with the control channels, at least one constraints relates to a minimum number of control reports that can be transmitted by the wireless communications apparatus over the resource indices for a control data type, and transmit control reports on the control channels according to the constraints. Additionally, the apparatus can comprise a memory coupled to the processor.

To the accomplishment of the foregoing and related ends, the one or more embodiments comprise the features hereinafter fully described and particularly pointed out in the claims. The following description and the annexed drawings set forth in detail certain illustrative aspects of the one or more embodiments. These aspects are indicative, however, of but a few of the various ways in which the principles of various embodiments may be employed and the described embodiments are intended to include all such aspects and their equivalents.

DETAILED DESCRIPTION

Figure 1:
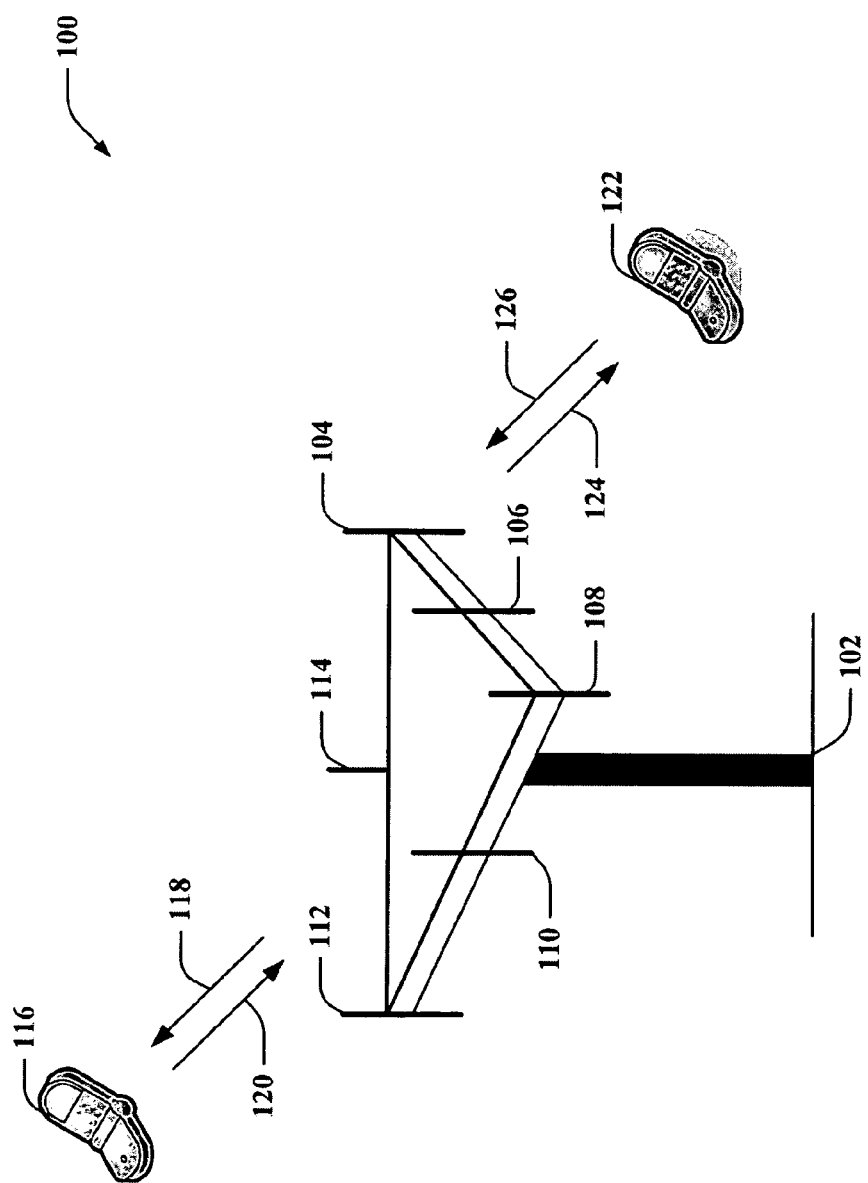
FIG. 1 is an illustration of a wireless communication system in accordance with various aspects set forth herein.

Various embodiments are now described with reference to the drawings, wherein like reference numerals are used to refer to like elements throughout. In the following description, for purposes of explanation, numerous specific details are set forth in order to provide a thorough understanding of one or more embodiments. It may be evident, however, that such embodiment(s) can be practiced without these specific details. In other instances, well-known structures and devices are shown in block diagram form in order to facilitate describing one or more embodiments.

As used in this application, the terms "component," "module," "system," and the like are intended to refer to a computer-related entity, either hardware, firmware, a combination of hardware and software, software, or software in execution. For example, a component can be, but is not limited to being, a process running on a processor, a processor, an object, an executable, a thread of execution, a program, and/or a computer. By way of illustration, both an application running on a computing device and the computing device can be a component. One or more components can reside within a process and/or thread of execution and a component can be localized on one computer and/or distributed between two or more computers. In addition, these components can execute from various computer readable media having various data structures stored thereon. The components can communicate by way of local and/or remote processes such as in accordance with a signal having one or more data packets (e.g., data from one component interacting with another component in a local system, distributed system, and/or across a network such as the Internet with other systems by way of the signal).

Furthermore, various embodiments are described herein in connection with a mobile device. A mobile device can also be called a system, subscriber unit, subscriber station, mobile station, mobile, remote station, remote terminal, access terminal, user terminal, terminal, wireless communication device, user agent, user device, or user equipment (UE). A mobile device can be a cellular telephone, a cordless telephone, a Session Initiation Protocol (SIP) phone, a wireless local loop (WLL) station, a personal digital assistant (PDA), a handheld device having wireless connection capability, computing device, or other processing device connected to a wireless modem. Moreover, various embodiments are described herein in connection with a base station. A base station can be utilized for communicating with mobile device(s) and can also be referred to as an access point, Node B, or some other terminology.

Moreover, various aspects or features described herein can be implemented as a method, apparatus, or article of manufacture using standard programming and/or engineering techniques. The term "article of manufacture" as used herein is intended to encompass a computer program accessible from any computer-readable device, carrier, or media. For example, computer-readable media can include but are not limited to magnetic storage devices (e.g., hard disk, floppy disk, magnetic strips, etc.), optical disks (e.g., compact disk (CD), digital versatile disk (DVD), etc.), smart cards, and flash memory devices (e.g., EPROM, card, stick, key drive, etc.). Additionally, various storage media described herein can represent one or more devices and/or other machine-readable media for storing information. The term "machine-readable medium" can include, without being limited to, wireless channels and various other media capable of storing, containing, and/or carrying instruction(s) and/or data.

Referring now to FIG. 1, a wireless communication system 100 is illustrated in accordance with various embodiments presented herein. System 100 comprises a base station 102 that can include multiple antenna groups. For example, one antenna group can include antennas 104 and 106, another group can comprise antennas 108 and 110, and an additional group can include antennas 112 and 114. Two antennas are illustrated for each antenna group; however, more or fewer antennas can be utilized for each group. Base station 102 can additionally include a transmitter chain and a receiver chain, each of which can in turn comprise a plurality of components associated with signal transmission and reception (e.g., processors, modulators, multiplexers, demodulators, demultiplexers, antennas, etc.), as will be appreciated by one skilled in the art.

Base station 102 can communicate with one or more mobile devices such as mobile device 116 and mobile device 122; however, it is to be appreciated that base station 102 can communicate with substantially any number of mobile devices similar to mobile devices 116 and 122. Mobile devices 116 and 122 can be, for example, cellular phones, smart phones, laptops, handheld communication devices, handheld computing devices, satellite radios, global positioning systems, PDAs, and/or any other suitable device for communicating over wireless communication system 100. As depicted, mobile device 116 is in communication with antennas 112 and 114, where antennas 112 and 114 transmit information to mobile device 116 over a forward link 118 and receive information from mobile device 116 over a reverse link 120. Moreover, mobile device 122 is in communication with antennas 104 and 106, where antennas 104 and 106 transmit information to mobile device 122 over a forward link 124 and receive information from mobile device 122 over a reverse link 126. In a frequency division duplex (FDD) system, forward link 118 can utilize a different frequency band than that used by reverse link 120, and forward link 124 can employ a different frequency band than that employed by reverse link 126, for example. Further, in a time division duplex (TDD) system, forward link 118 and reverse link 120 can utilize a common frequency band and forward link 124 and reverse link 126 can utilize a common frequency band.

Each group of antennas and/or the area in which they are designated to communicate can be referred to as a sector of base station 102. For example, antenna groups can be designed to communicate to mobile devices in a sector of the areas covered by base station 102. In communication over forward links 118 and 124, the transmitting antennas of base station 102 can utilize beamforming to improve signal-to-noise ratio of forward links 118 and 124 for mobile devices 116 and 122. Also, while base station 102 utilizes beamforming to transmit to mobile devices 116 and 122 scattered randomly through an associated coverage, mobile devices in neighboring cells can be subject to less interference as compared to a base station transmitting through a single antenna to all its mobile devices. Moreover, mobile devices 116 and 122 can communicate directly with one another using a peer-to-peer or ad hoc technology as depicted.

According to an example, system 100 can be a multiple-input multiple-output (MIMO) communication system. Further, system 100 can utilize substantially any type of duplexing technique to divide communication channels (e.g. forward link, reverse link, . . . ) such as FDD, TDD, and the like. The communication channels can comprise one or more logical channels. Such logical channels can be provided for transmitting control data between the mobile devices 116 and 122 and the base station 102 (or from mobile device 116 to mobile device 122 in a peer-to-peer configuration, for example). In an example, the mobile devices 116 and 122 can send channel quality information (CQI) to the base station 102 to indicate parameters regarding an allocated communication channel. Based on the CQI control data, for example, the base station 102 can allocate additional channel resources to the mobile devices 116 and/or 122. Moreover, there can be constraints applied to the control channels to provide the mobile devices 116 and 122 flexibility with respect to transmitting the data, or to ensure that proper and/or sufficient control data is received and the channels are not overloaded, for example.

In one example, where CDMA or OFDMA wireless network configurations are utilized, bandwidth can be separated into one or more units of time, such as symbols, having one or more units of frequency, such as subcarriers. The subcarriers over each symbol can represent logical channels, and some of the logical channels can be dedicated to transmitting control data. Additionally, the symbols can be divided into frames, for example, an OFDMA configuration can have 8 OFDM symbols comprising a physical frame, in one example. A number of logical control channels can be defined over one or more subcarriers of one or more frames, which can be utilized by the mobile devices 116 and 122 to transmit CQI or other control data to the base station 102. The control channels can have assigned resource indices that identify the channels across one or more frames. Moreover, constraints on utilization of the control channels can be communicated to the mobile devices 116 and 122 for the reasons mentioned above. In particular, the constraints can include specific requirements as to resource indices that a given mobile device 116 and 122 can and/or cannot utilize to transmit control data, a minimum, maximum, or exact number of resource indices that can be utilized in one or more frames, a minimum change in control data payload, and/or a maximum number of out-of-band control channels that can be used based at least in part on a number of in-band control channels used.

The constraints can be communicated to the mobile devices 116 and 122 in substantially any manner including, but not limited to, transmitted by the base station 102 in one or more previous communications, configured within the mobile devices 116 and 122, specified by a disparate device or component communicatively coupled to the phone, inferred from one or more metrics including activity level, interference level, etc., and the like. Once the constraints are obtained, the mobile devices 116 and 122 can adhere to the constraints when transmitting control data to the base station 102.

Figure 2:
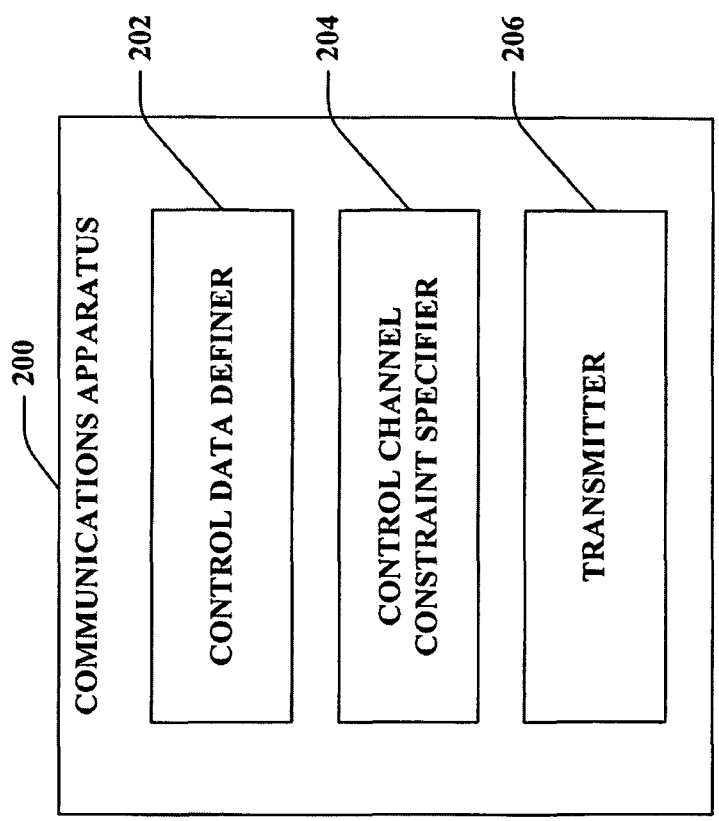
FIG. 2 is an illustration of an example communications apparatus for employment within a wireless communications environment.

Turning to FIG. 2, illustrated is a communications apparatus 200 for employment within a wireless communications environment. The communications apparatus 200 can be a base station or a portion thereof, a mobile device or a portion thereof, or substantially any communications apparatus that receives data transmitted in a wireless communications environment. The communications apparatus 200 can include a control data definer 202 that formulates control data (e.g., CQI pilot reports and/or CQI control reports), a control channel constraint specifier 204 that can apply one or more constraints on the defined control channels, and a transmitter 206 that transmits the control data according to the channel constraints.

According to an example, the communications apparatus 200 can communicate control data regarding a communications channel, for example, to one or more disparate devices. To facilitate this communication, the control data definer 202 can measure and formulate the control data, such as CQI data, for example. The control channel constraint specifier 204 can conform desired control data to one or more constraints before transmitting the data via transmitter 206. The constraints can correspond to a number of resource indices assigned by a device to which the CQI data relates; the resource indices can represent logical control channels in bandwidth (e.g., having a payload of one or more subcarriers over one or more OFDM symbols, or other symbol as mentioned above, over one or more frames) as opportunities to transmit control data. For example, the constraints can specify specific requirements within the resource indices, such as requiring certain control data to be transmitted at certain resource indices. In addition, the constraints can be more general, for example, specifying a minimum and/or maximum number of control reports transmitted over the resource indices. This provides more flexibility for the communications apparatus 200 transmitting control data as in scheduling control data transmission. This can be useful for power control, where the communications apparatus 200 can transmit the minimum number of reports, for example. Additionally, specifying the maximum number of control reports can prevent control channel overload. It is to be appreciated that the constraints can also specify an exact number of reports to be sent to provide the same benefits; by specifying a number of resource indices and not specific indices, the communications apparatus 200 has the option to choose when to send control reports thus allowing the communications apparatus 200 to account for power consumption, interference, and the like.

Moreover, back-off constraints can be specified where the minimum, maximum, and/or exact number of reports can be diminished throughout time as to prevent channel overload. For example, where the communications apparatus 200 is handed off to a new sector, a handoff request can be transmitted to an access point of the sector. In one example, the access point can receive the request, but not respond due to lack of resources. In this case, since the communications apparatus 200 may not receive a response from the access point; the back-off constraints can be utilized to diminish the frequency of the hand-off request transmitted by the communications apparatus 200 as to not overload the access point. Additionally, another constraint can be a minimum change in payload of control reports to limit load on the control channel. Furthermore, another constraint can relate to limiting a number of out-of-band reports based on recent in-band reports. For example, an in-band report can be CQI data appended to other communications (e.g., MAC packets for power amplifier headroom, request channels, etc.) whereas out-of-band reporting relates to transmitting reports on the dedicated control channels.

Figure 3:
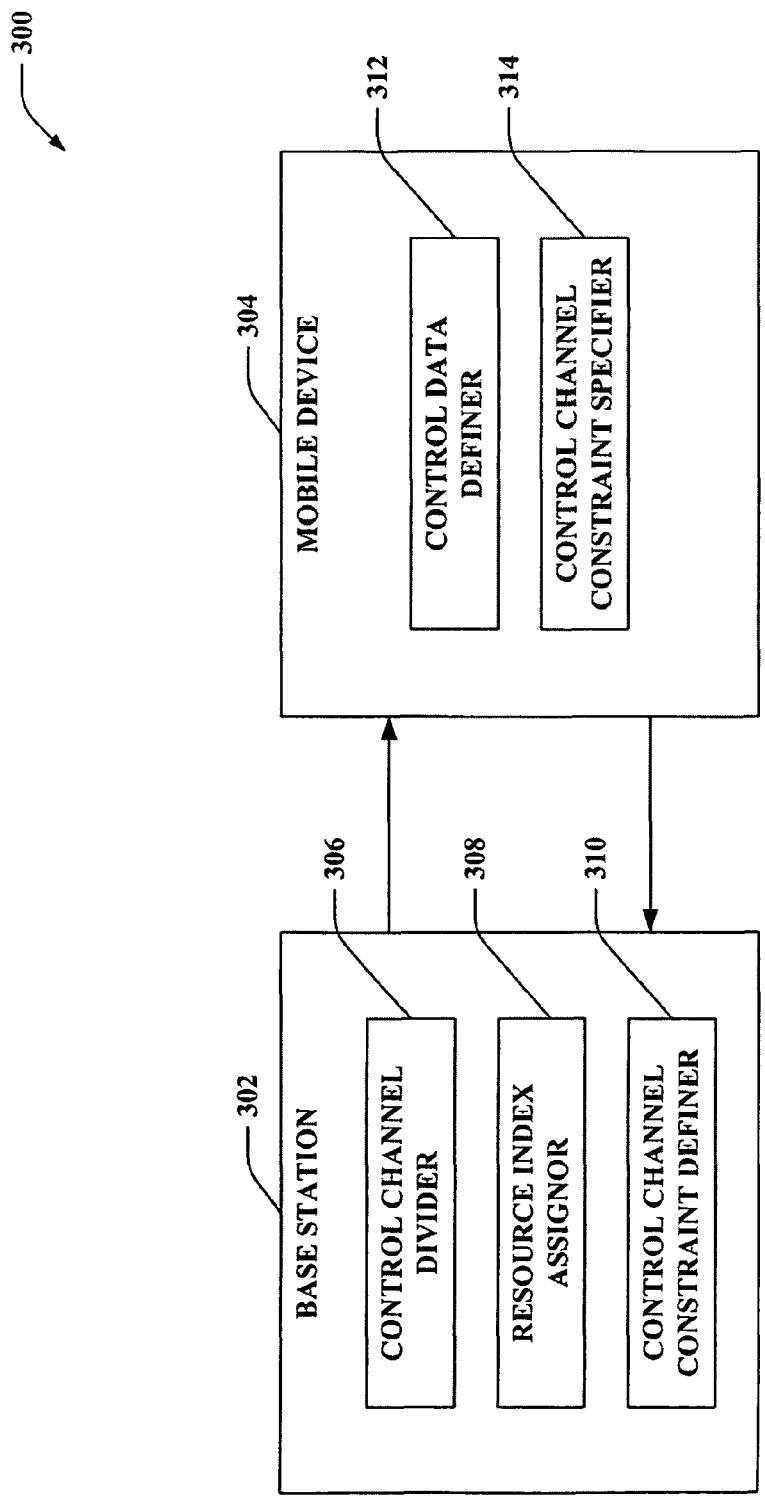
FIG. 3 is an illustration of an example wireless communications system that effectuates transmitting and receiving control data.

Now referring to FIG. 3, illustrated is a wireless communications system 300 that can communicate control data according to one or more constraints placed on the control channel. The system 300 includes a base station 302 that communicates with a mobile device 304 (and/or any number of disparate mobile devices (not shown)). Base station 302 can transmit information to mobile device 304 over a forward link channel; further base station 302 can receive information from mobile device 304 over a reverse link channel. Moreover, system 300 can be a MIMO system. Additionally, the system 300 can operate in an OFDMA wireless network (such as 3GPP for example). Also, the components and functionalities shown and described below in the base station 302 can be present in the mobile device 304 as well and vice versa, in one example; the configuration depicted excludes these components for ease of explanation.

Base station 302 includes a control channel divider 306 that can reserve portions of bandwidth for transmitting control data, such CQI pilot and control data as well as other control data, a resource index assignor 308 that can provide resource indices to one or more mobile devices 304 related to the divided control channels, and a control channel constraint definer 310 that can generate constraints for the mobile device 304 with respect to the divided control channels. This information can be transmitted to the mobile device 304. According to an example, the bandwidth can be separated into frames of one or more OFDM symbols (e.g. 8 symbols per frame in an OFDMA configuration) having a plurality of subcarriers. The control channel divider 306 can assign control data transmission to one or more subcarriers over one or more symbols in one or more frames, and the resource index assignor 308 can accordingly enumerate the control channels. For example, the control channels can be assigned a period and phase related to the frames where the period indicates a grouping of frames, and the phase indicates on which grouping the channels can be utilized. Thus, for a control channel having a period of 2 and a phase of 1, control channels can be available for transmission over the second frame taking the frames in pairs; the resource indices can be enumerated over the available control channels of the frame period. It is to be appreciated that the period and phase information can change for given control channel, which can affect the enumeration of the resource indices. Constraints can be placed on the control channels, such as those described previously, by the control channel constraint definer 310 to provide diversity and flexibility with respect to mobile devices 304 transmitting control data. For example, the constraints can relate to a number of reports that can be transmitted over the resource indices.

Mobile device 304 includes a control data definer 312 that can generate control data to be sent to the base station 302, such as CQI or other control data and a control channel constraint specifier 314 that can apply one or more control channel constraints upon transmitting the control data. In one example, the control data definer 312 can generate control data reports to send to the base station 302, the control data can include a quality of a channel, such as a request channel, power amplifier channel, etc. The control data reports can be scheduled for transmission over a control channel by the control channel constraint specifier 314 according to constraints received from the base station 302. In the OFDM example, the constraints can be related to transmitting control reports over one or more logical control channels according to one or more resource indices. The constraints can specify a number of reports that can be transmitted over one or more control channels utilizing the opportunities available from the resource indices (minimum, maximum, and/or exact, for example), specific requirements for utilizing specific indices, minimum change in payload, and the like as explained supra.

For example, the base station 302, upon dividing the control channels, assigning resource indices, and determining constraints for the channels as described above, can transmit the resource indices and control channel constraints to the mobile device 304. It is to be appreciated that this information can additionally or alternatively be received upon or following channel assignment to the mobile device 304 from the base station 302. Upon receiving this information, the mobile device 304 can formulate control data utilizing the control data definer 312, and transmit the control data to the base station 302 based at least in part on the defined constraints using the control channel constraint specifier 314. In addition, the constraints can be fulfilled according to a number of schemes. For example, if the mobile device 304 desires to conserve power, it can transmit a number of control data reports to sufficiently satisfy a constraint related to the minimum number of reports that should be transmitted over the resource indices. If the mobile device 304 is highly active and roaming about a sector, for example, it can choose to transmit a number of control reports according to a constraint related to the maximum number of reports that can be transmitted over a control channel utilizing the available resource indices. The established maximum can be configured to prevent channel overload, in one example. Moreover, as mentioned, this can be accomplished by specifying a constraint related to limiting the change in payload where a report subsequent to a first report may not exceed a difference in payload according to the constraint. Required constraints can also be transmitted to the mobile device 304, such as requiring specific control reports within specific resource indices. Also, an exact number of reports can be specified as a constraint where a definite structure is desired.

Furthermore, the constraints can be granular per control channel and/or control data type, such that different constraints can apply to different sets or types of control data, though the same set of control channels can be used for both or substantially all types in one example. Therefore, in one example, given a number of possible control channels on which to transmit control data, the mobile device 304 can receive constraints limiting maximum and minimum CQI reports that can transmit over available resource indices related to the control channel as well as a constraint specifying exact resource indices to use for transmitting subband feedback. This is just one example of substantially limitless combinations given the available control data types and aforementioned constraints. Additionally, as mentioned, the constraints can vary over time; for example, where a handoff occurs, the mobile device 304 can initially receive a number of resource indices on which to transfer control data, but that number can diminish exponentially in subsequent frame periods as an unanswered handoff request is continuously transmitted by the mobile device 304.

In another example, a constraint corresponding to an exact number of reports to be sent over available resource indices can be used in conjunction with an erasure detection algorithm for adjusting transmission power of the mobile device 304, for example. By utilizing the exact number of reports to expect as a control channel constraint, the number of reports received can be measured to indicate the number of reports that were erased. Using this information (e.g., if the rate is above or below a given threshold), the base station 302 can issue power signal commands to the mobile device, and the mobile device 304 can utilize an outer loop to power-up or power-down subsequent transmissions, for example.

Figure 4:
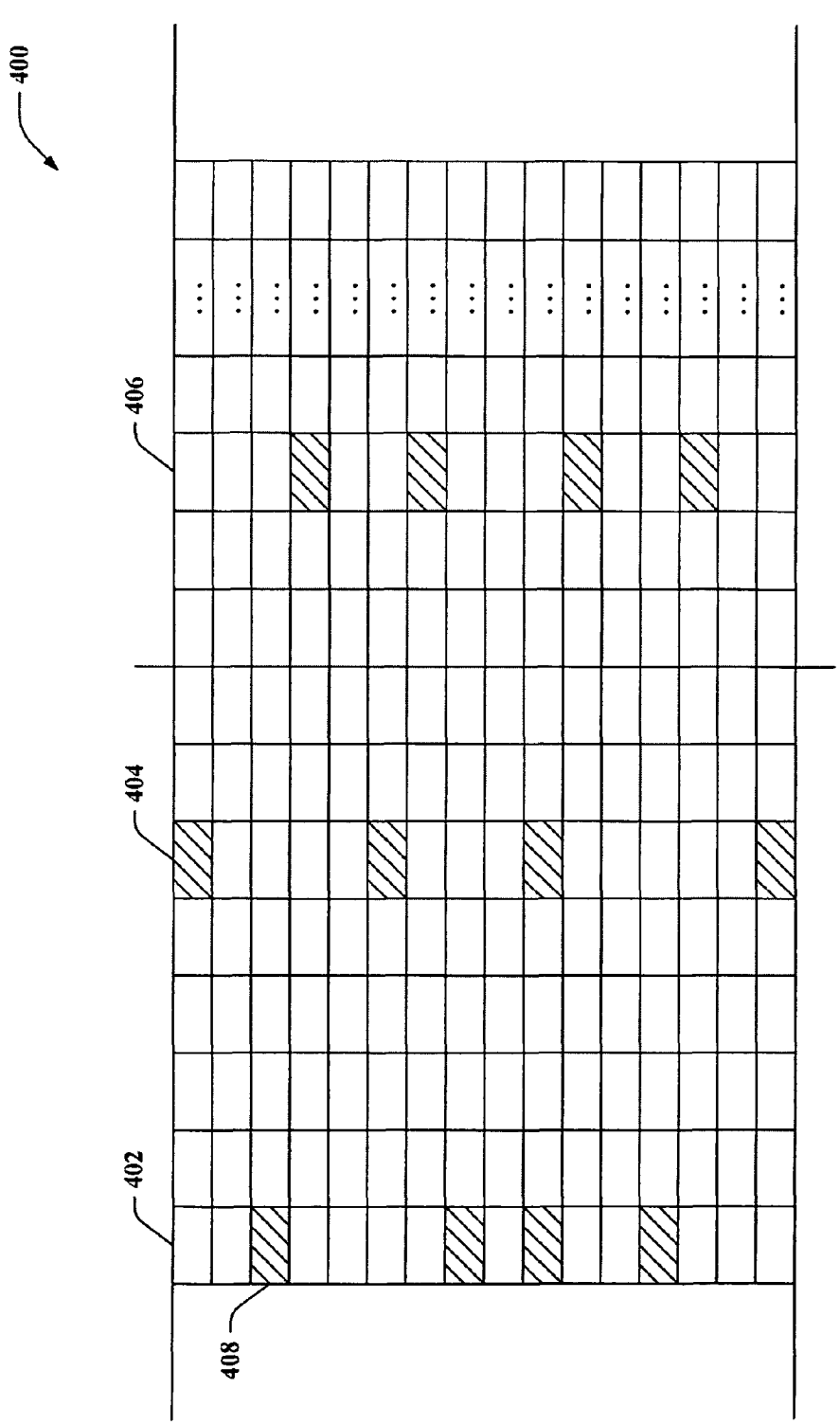
FIG. 4 is an illustration of example bandwidth with multiple control channels.

Now referring to FIG. 4, an example of one or more communication frames 400 for wireless communications is shown. The frames can comprise a plurality of symbols (such as 8 OFDM symbols, as shown) comprising a plurality of subcarriers. The columns can represent OFDM symbols, which are a collection of frequency subcarriers (or tones) over a given time period. The frames can comprise substantially any number of symbol periods, and the symbol periods can comprise substantially any number of subcarriers. As shown, the frames can comprise a plurality of symbol periods over which control data is transmitted 402, 404, and 406. The control data can be transmitted across a plurality of subcarriers, such as subcarrier 408 and the like. It is to be appreciated that the control data can be transmitted in substantially any symbol, subcarrier of the symbol, or combination of symbols and/or subcarriers; the displayed example is just one possible utilization.

According to an example, the illustrated segments 408 can represent subcarriers that can relate to one or more logical channels (e.g. where one or more subcarriers, or portions thereof, can be a payload for the channels) for transmitting multiple types of control information. For example, one or more logical channels can be utilized for transmitting CQI information, request data, power amplifier headroom information, and/or the like. In another example, the subcarriers 408 can represent different physical control channels for transmitting CDMA control data, pilot channel data, dedicated control information, feedback data (e.g., in a MIMO configuration), and/or reverse link access channel information. In either example, the control channels can be assigned resource indices (e.g., 0 to n−1, where n is the number of available control channels in a given frame period, which can be modified as mentioned supra), where each resource index can relate to one or a collection of subcarriers 408 that form the logical control channel. The resource indices can be enumerated for a specified frame period, as described above, which can relate to one or more contiguous frames; in addition, one or more phases can be specified indicating the frames in the contiguous period over which the control channel can be available. For example, a period and phase of 1 can indicate that a control channel (or additional channels related to a channel type) is available in each defined physical frame. A period of 2 and phase of 0, on the other hand, can indicate that the control channel(s) are available over every other physical frame beginning with the first frame in a 2-frame set, for example.

As mentioned, the resource indices can be enumerated throughout the 2-frame set and reset/repeated in subsequent 2-frame sets, or other combinations of period and phase, as the control channel specifications can change over time. A mobile device can receive information regarding the available resource indices on which to transmit control data along with constraints regarding the control channels. For example, the communication frame 400 shows 12 available subcarriers over at least two frames, one or more of which can relate to one or more logical control channels. A mobile device can receive resource indices related to each of the control channels along with constraints that specify, for example, that only a maximum of 3 control reports can be utilized in frame 400; this can involve the use of one or more of the control channels. This can ensure that the channel is not overloaded, depending on the payload of the control report. In another example, a constraint can be provided specifying that a minimum of 3 control reports need to be transmitted in frame 400. In this case, since the resource indices to use are not forced upon a mobile device, the device can choose to utilize channels in symbol 404 to conserve power as no data needs to be sent during the other control time periods.

In addition, as described, the constraints can specify that an exact number, such as 6, control reports need to be transmitted in the one or more frames 400. In this regard, the number of control reports received can be compared to the number that were supposed to be sent to determine an erasure rate for outer loop power control. Moreover, constraints can be set for out-of-band control channel usage based at least in part on previous in-band usage as described previously. Also, the control reports can be of disparate type as described, and each type can have a related set of constraints, for example.

Figure 5:
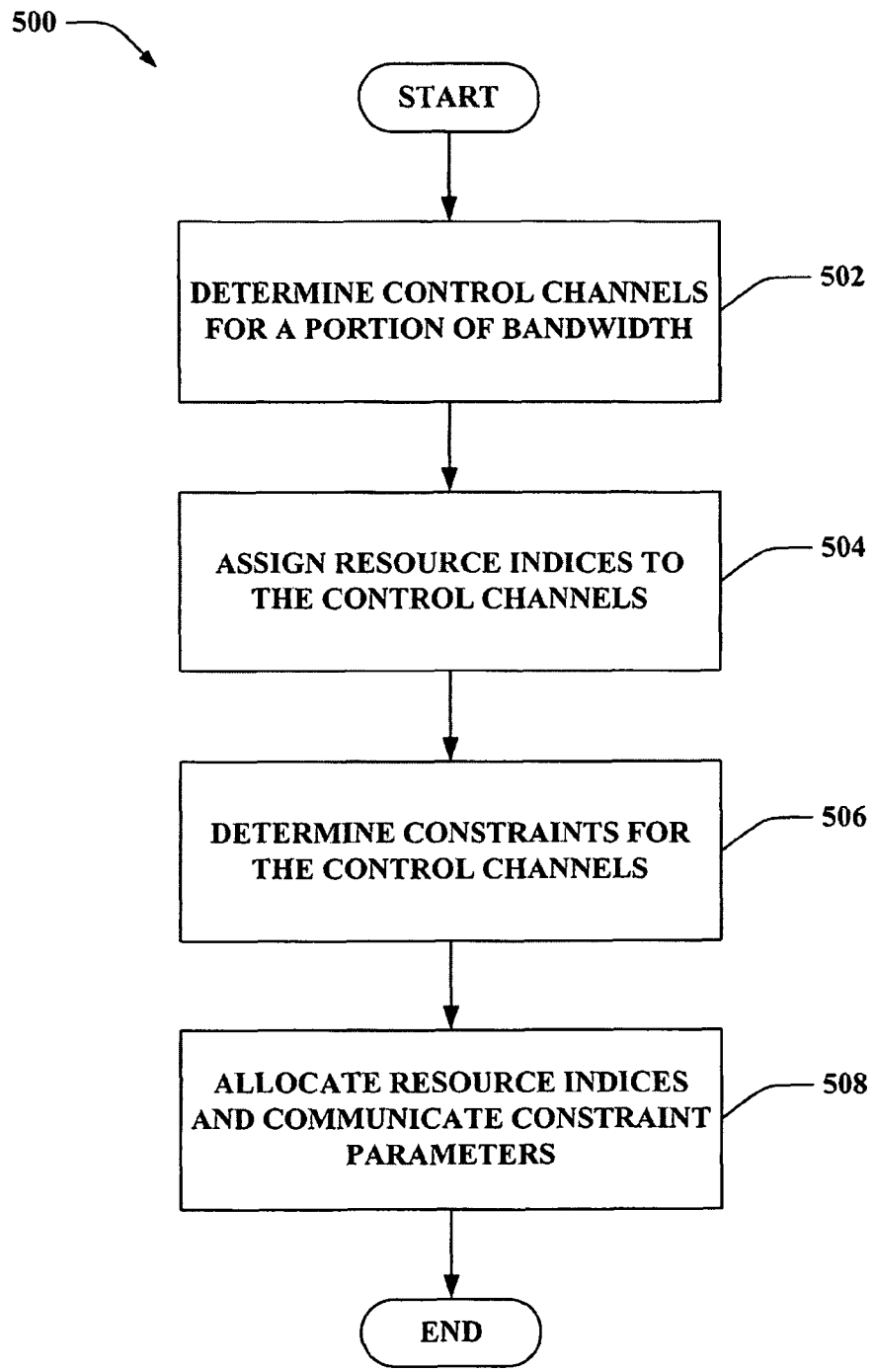
FIG. 5 is an illustration of an example methodology that facilitates generating constraints for control channels.
Figure 6:
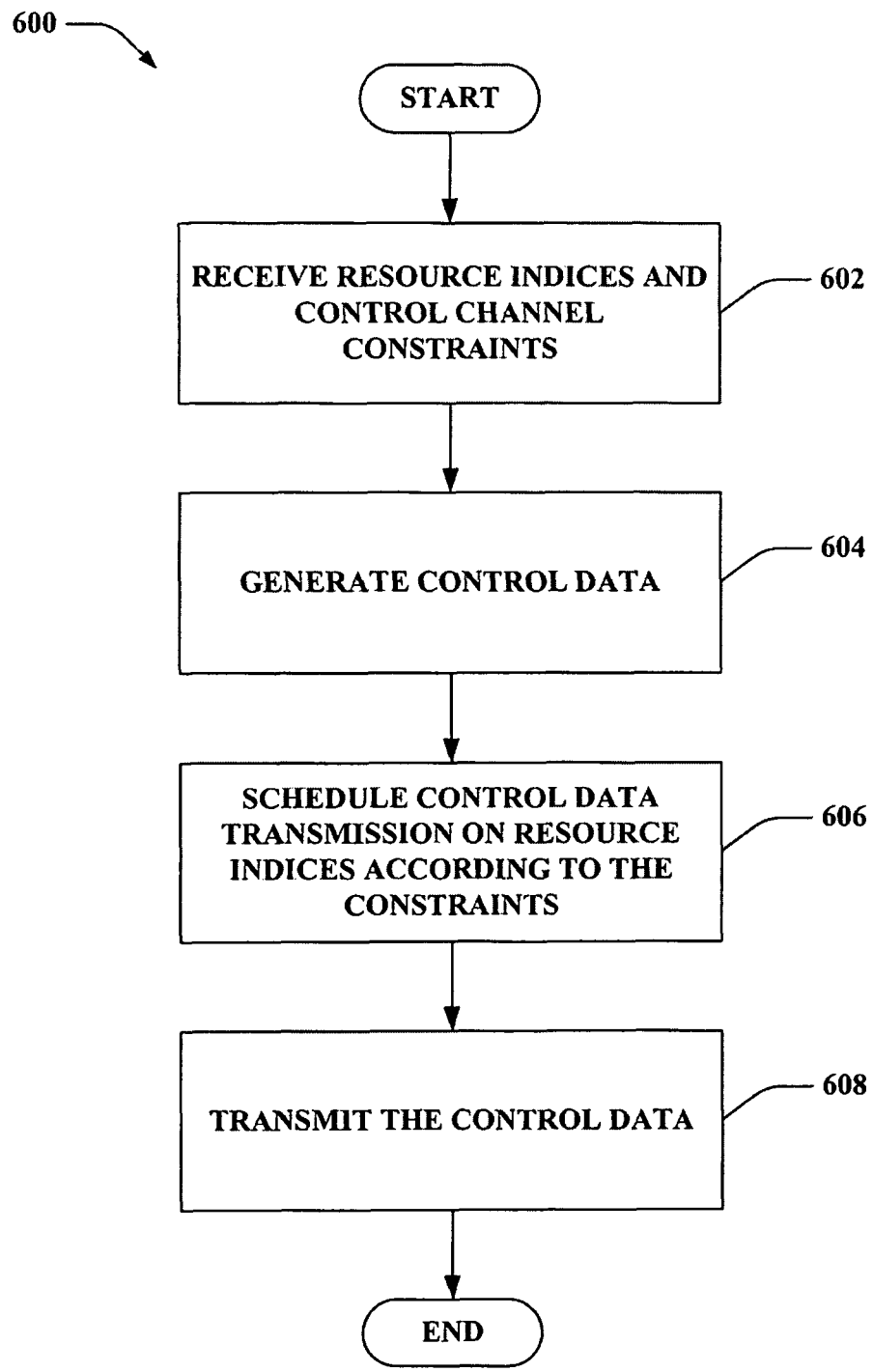
FIG. 6 is an illustration of an example methodology that facilitates utilizing control channels according to the constraints.

Referring to FIGS. 5-6, methodologies relating to providing constraints for control channels in a wireless communication network are illustrated. While, for purposes of simplicity of explanation, the methodologies are shown and described as a series of acts, it is to be understood and appreciated that the methodologies are not limited by the order of acts, as some acts may, in accordance with one or more embodiments, occur in different orders and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with one or more embodiments.

Turning to FIG. 5, illustrated is a methodology 500 that facilitates specifying control channels along with constraints for utilization thereof by one or more devices. At 502, control channels can be determined for a portion of bandwidth. For example, the bandwidth can be utilized according to an OFDMA, CDMA, or another protocol where the bandwidth can be separated into symbols having a plurality of subcarriers or frequency bins. The control channels can relate to one or more, or a portion of, a plurality of subcarriers over one or more symbols for a given frame period as described previously. At 504, resource indices can be assigned to the control channels in the given frame period and phase configuration to ease identification of the control channels. The indices can indicate opportunities within a given frame period for transmitting control data.

At 506, constraints for the control channels can be determined. As described, the constraints can relate to specifying an exact, minimum, and/or maximum number of resource indices or opportunities that can be utilized to transmit control reports. Additionally, the foregoing constraints can vary per control data type; constraints can also specify a minimum allowed change in payload for certain types of control data. The constraints can further specify an out-of-band maximum based on previous in-band communications, for example. At 508, the resource indices can be allocated, such as to one or more mobile devices, and the constraint parameters can be communicated as well to allow transmission of control data according to the indices and constraints.

Now referring to FIG. 6, a methodology 600 that facilitates transmitting control data according to one or more channel constraints is illustrated. At 602, resource indices and control channel constraints can be received. The constraints and indices can be one or more of those described above. At 604, control data can be generated; this can include, for example, CQI pilot reports, CQI control reports, power amplifier control reports, and/or the like. At 606, the control data can be scheduled on one or more resource indices according to the constraints. For example, as described above, a number of resource indices can be received for transferring control data, but a maximum allowance of control reports transmitted over the resource indices for a frame period can be specified. Likewise, a minimum required number of control reports of the provided resource indices can be specified as well. Moreover, as described, an exact number of indices can be provided as a constraint and/or substantially any combination of the foregoing with respect to disparate control data types, for example. At 608, the control data can be transmitted.

It will be appreciated that, in accordance with one or more aspects described herein, inferences can be made regarding specifying and utilizing constraints in control channel signaling as described. As used herein, the term to "infer" or "inference" refers generally to the process of reasoning about or inferring states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources.

According to an example, one or more methods presented above can include making inferences pertaining to setting constraints for one or more types of control data, assigning resource indices, defining control channels over a number of symbols and/or frame periods, allocating resource indices to one or more mobile devices, and the like. For example, the inferences can relate to previous behaviors with respect to disparate mobile devices, etc. Additionally, inferences can be made by one or more mobile devices with respect to generating and scheduling control data, and/or the like. For example, the inferences can be based at least in part on previous utilizations of the control channel.

Figure 7:
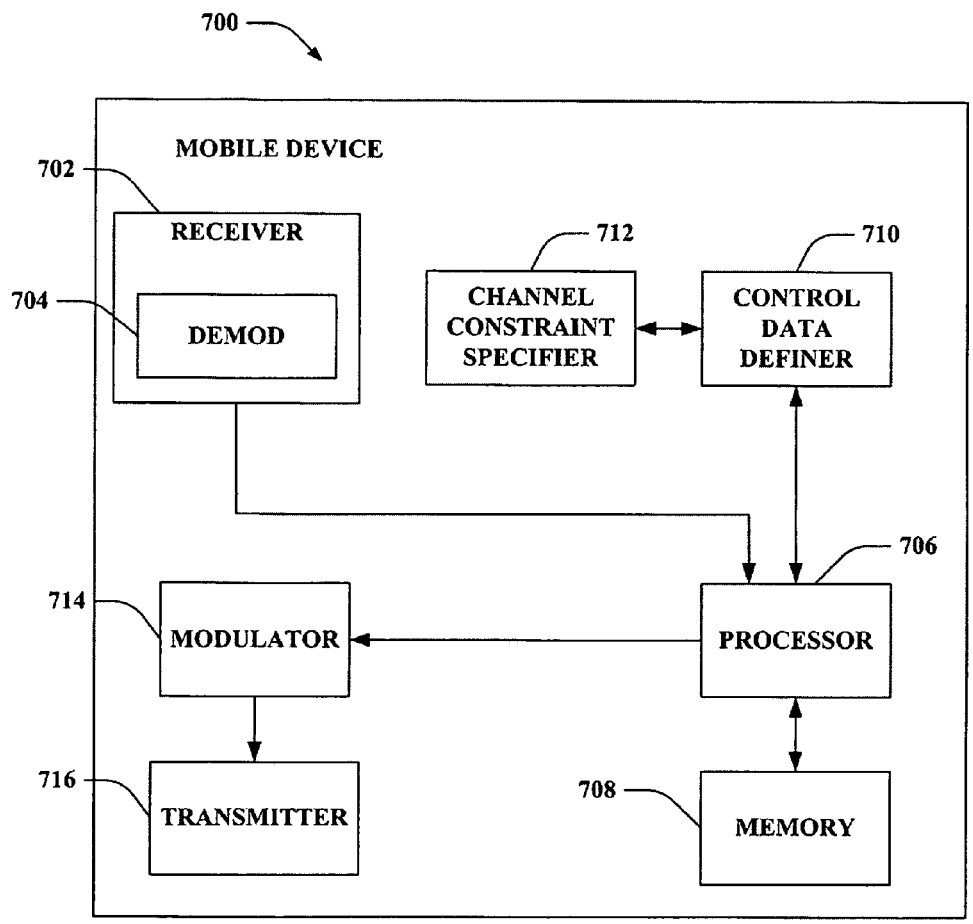
FIG. 7 is an illustration of an example mobile device that facilitates transmitting control data according to constraints on the channel.

FIG. 7 is an illustration of a mobile device 700 that facilitates transmitting control data over control channels according to one or more constraints. Mobile device 700 comprises a receiver 702 that receives a signal from, for instance, a receive antenna (not shown), performs typical actions on (e.g., filters, amplifies, downconverts, etc.) the received signal, and digitizes the conditioned signal to obtain samples. Receiver 702 can comprise a demodulator 704 that can demodulate received symbols and provide them to a processor 706 for channel estimation. Processor 706 can be a processor dedicated to analyzing information received by receiver 702 and/or generating information for transmission by a transmitter 716, a processor that controls one or more components of mobile device 700, and/or a processor that both analyzes information received by receiver 702, generates information for transmission by transmitter 716, and controls one or more components of mobile device 700.

Mobile device 700 can additionally comprise memory 708 that is operatively coupled to processor 706 and that can store data to be transmitted, received data, information related to available channels, data associated with analyzed signal and/ or interference strength, information related to an assigned channel, power, rate, or the like, and any other suitable information for estimating a channel and communicating via the channel. Memory 708 can additionally store protocols and/or algorithms associated with estimating and/or utilizing a channel (e.g., performance based, capacity based, etc.).

It will be appreciated that the data store (e.g., memory 708) described herein can be either volatile memory or nonvolatile memory, or can include both volatile and nonvolatile memory. By way of illustration, and not limitation, nonvolatile memory can include read only memory (ROM), programmable ROM (PROM), electrically programmable ROM (EPROM), electrically erasable PROM (EEPROM), or flash memory. Volatile memory can include random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). The memory 708 of the subject systems and methods is intended to comprise, without being limited to, these and any other suitable types of memory.

Processor 706 can further be operatively coupled to a control data definer 710 that generates control data and a channel constraint specifier 712 that can ensure communications transmitted on control channels comply with one or more received constraints. In one example, the control data definer 710 can gather or generate control data to send to a device that is in communication with the mobile device 700 (or a disparate device). The control data can include, for example, CQI pilot reports, CQI control reports, power amplifier information, subband feedback, general feedback, and/or the like. It is to be appreciated that the control data can be gathered from other components, the processor 706, etc. Once the data is defined, the channel constraint specifier 712 can ensure that transmission of the control data complies with one or more constraints, as described above, including a minimum, maximum, or each number of reports to be transmitted, a minimum allowed payload change size, specific requirements for specific resource indices, out-of-band control transmission limitations based on previous in-band transmissions, and/or the like.

Moreover, as mentioned, the constraints can be utilized in many contexts, such as to provide flexibility to the mobile device 700 in transmitting control data according to maximum/minimum numbers of reports. Additionally, erasure rates can be calculated by specifying an exact number of reports, and the constraints need not apply to substantially all available control channels; rather, there can be different constraints for different control channels or channels transmitting different types of control data. Mobile device 700 still further comprises a modulator 714 and transmitter 716 that respectively modulate and transmit signals to, for instance, a base station, another mobile device, etc. Although depicted as being separate from the processor 706, it is to be appreciated that the control data definer 710, channel constraint specifier 712, demodulator 704, and/or modulator 714 can be part of the processor 706 or multiple processors (not shown).

Figure 8:
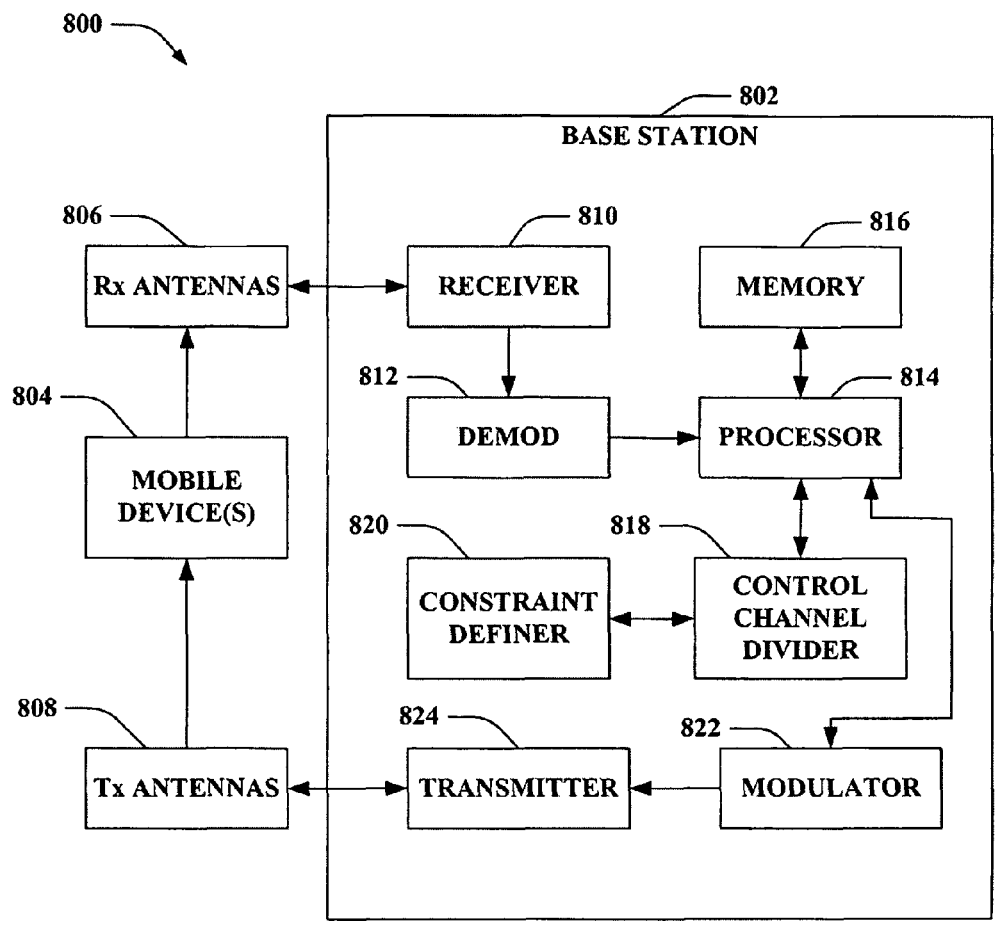
FIG. 8 is an illustration of an example system that facilitates defining control channels and constraints for the channels.

FIG. 8 is an illustration of a system 800 that facilitates generating control channels and one or more constraints for the control channels. The system 800 comprises a base station 802 (e.g. access point, . . . ) with a receiver 810 that receives signal(s) from one or more mobile devices 804 through a plurality of receive antennas 806, and a transmitter 824 that transmits to the one or more mobile devices 804 through a transmit antenna 808. Receiver 810 can receive information from receive antennas 806 and is operatively associated with a demodulator 812 that demodulates received information. Demodulated symbols are analyzed by a processor 814 that can be similar to the processor described above with regard to FIG. 7, and which is coupled to a memory 816 that stores information related to estimating a signal (e.g., pilot) strength and/or interference strength, data to be transmitted to or received from mobile device(s) 804 (or a disparate base station (not shown)), and/or any other suitable information related to performing the various actions and functions set forth herein. Processor 814 is further coupled to a control channel divider 818 that determines portions of a communication channel reserved for control data and a constraint definer 820 that can generate one or more constraints on one or more control channels.

According to an example, the control channel divider 818 can specify portions of bandwidth that are reserved for control data communication; these can be at the edges of the bandwidth or at substantially any location in the bandwidth. The portions can be specified based on hard-coded specifications, real-time configurations, received from disparate devices or network components, etc. In one example, the portions allocated to channels can be one or more OFDM symbols and/or one or more subcarriers thereof. In this example, the constraint definer 820 can specify one or more constraints for the control channels. The constraints can be one or more of those described herein and can vary per channel, and/or per type of control data transmitting on the channel, for example. Furthermore, although depicted as being separate from the processor 814, it is to be appreciated that the control channel divider 818, constraint definer 820, demodulator 812, and/or modulator 822 can be part of the processor 814 or multiple processors (not shown).

Figure 9:
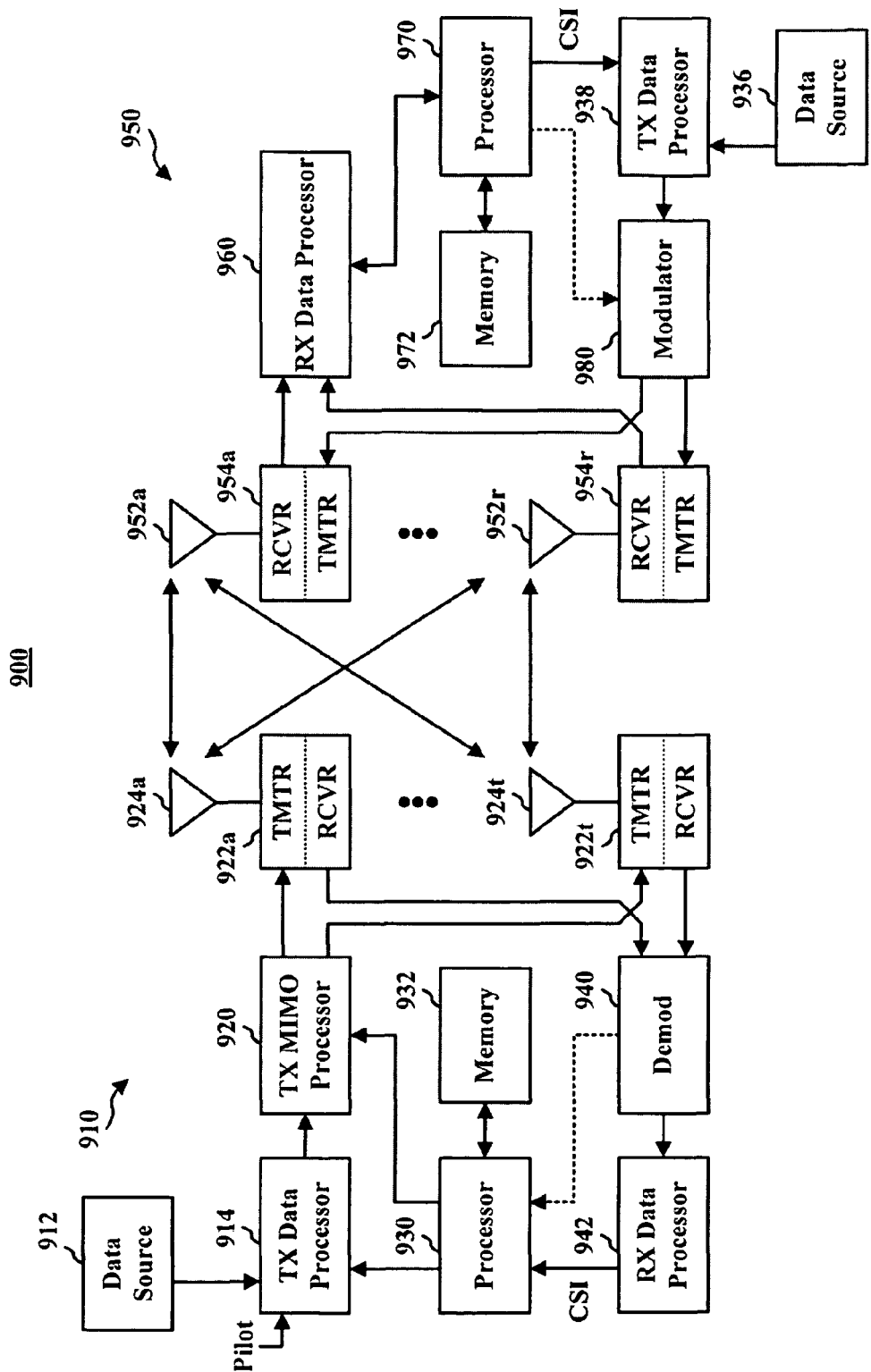
FIG. 9 is an illustration of an example wireless network environment that can be employed in conjunction with the various systems and methods described herein.

FIG. 9 shows an example wireless communication system 900. The wireless communication system 900 depicts one base station 910 and one mobile device 950 for sake of brevity. However, it is to be appreciated that system 900 can include more than one base station and/or more than one mobile device, wherein additional base stations and/or mobile devices can be substantially similar or different from example base station 910 and mobile device 950 described below. In addition, it is to be appreciated that base station 910 and/or mobile device 950 can employ the systems (FIGS. 1-3 and 8-9), techniques/configurations (FIGS. 4-5) and/or methods (FIGS. 6-7) described herein to facilitate wireless communication there between.

At base station 910, traffic data for a number of data streams is provided from a data source 912 to a transmit (TX) data processor 914. According to an example, each data stream can be transmitted over a respective antenna. TX data processor 914 formats, codes, and interleaves the traffic data stream based on a particular coding scheme selected for that data stream to provide coded data.

The coded data for each data stream can be multiplexed with pilot data using orthogonal frequency division multiplexing (OFDM) techniques. Additionally or alternatively, the pilot symbols can be frequency division multiplexed (FDM), time division multiplexed (TDM), or code division multiplexed (CDM). The pilot data is typically a known data pattern that is processed in a known manner and can be used at mobile device 950 to estimate channel response. The multiplexed pilot and coded data for each data stream can be modulated (e.g. symbol mapped) based on a particular modulation scheme (e.g., binary phase-shift keying (BPSK), quadrature phase-shift keying (QPSK), M-phase-shift keying (M-PSK), M-quadrature amplitude modulation (M-QAM), etc.) selected for that data stream to provide modulation symbols. The data rate, coding, and modulation for each data stream can be determined by instructions performed or provided by processor 930.

The modulation symbols for the data streams can be provided to a TX MIMO processor 920, which can further process the modulation symbols (e.g., for OFDM). TX MIMO processor 920 then provides $N_T$ modulation symbol streams to $N_T$ transmitters (TMTR) 922a through 922t. In various embodiments, TX MIMO processor 920 applies beamforming weights to the symbols of the data streams and to the antenna from which the symbol is being transmitted.

Each transmitter 922 receives and processes a respective symbol stream to provide one or more analog signals, and further conditions (e.g. amplifies, filters, and upconverts) the analog signals to provide a modulated signal suitable for transmission over the MIMO channel. Further, $N_T$ modulated signals from transmitters 922a through 922t are transmitted from $N_T$ antennas 924a through 924t, respectively.

At mobile device 950, the transmitted modulated signals are received by $N_R$ antennas 952a through 952r and the received signal from each antenna 952 is provided to a respective receiver (RCVR) 954a through 954r. Each receiver 954 conditions (e.g., filters, amplifies, and downconverts) a respective signal, digitizes the conditioned signal to provide samples, and further processes the samples to provide a corresponding "received" symbol stream.

An RX data processor 960 can receive and process the $N_R$ received symbol streams from $N_R$ receivers 954 based on a particular receiver processing technique to provide $N_T$ "detected" symbol streams. RX data processor 960 can demodulate, deinterleave, and decode each detected symbol stream to recover the traffic data for the data stream. The processing by RX data processor 960 is complementary to that performed by TX MIMO processor 920 and TX data processor 914 at base station 910.

A processor 970 can periodically determine which preceding matrix to utilize as discussed above. Further, processor 970 can formulate a reverse link message comprising a matrix index portion and a rank value portion.

The reverse link message can comprise various types of information regarding the communication link and/or the received data stream. The reverse link message can be processed by a TX data processor 938, which also receives traffic data for a number of data streams from a data source 936, modulated by a modulator 980, conditioned by transmitters 954a through 954r, and transmitted back to base station 910.

At base station 910, the modulated signals from mobile device 950 are received by antennas 924, conditioned by receivers 922, demodulated by a demodulator 940, and processed by a RX data processor 942 to extract the reverse link message transmitted by mobile device 950. Further, processor 930 can process the extracted message to determine which precoding matrix to use for determining the beamforming weights.

Processors 930 and 970 can direct (e.g., control, coordinate, manage, etc.) operation at base station 910 and mobile device 950, respectively. Respective processors 930 and 970 can be associated with memory 932 and 972 that store program codes and data. Processors 930 and 970 can also perform computations to derive frequency and impulse response estimates for the uplink and downlink, respectively.

It is to be understood that the embodiments described herein can be implemented in hardware, software, firmware, middleware, microcode, or any combination thereof. For a hardware implementation, the processing units can be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a combination thereof.

When the embodiments are implemented in software, firmware, middleware or microcode, program code or code segments, they can be stored in a machine-readable medium, such as a storage component. A code segment can represent a procedure, a function, a subprogram, a program, a routine, a subroutine, a module, a software package, a class, or any combination of instructions, data structures, or program statements. A code segment can be coupled to another code segment or a hardware circuit by passing and/or receiving information, data, arguments, parameters, or memory contents. Information, arguments, parameters, data, etc. can be passed, forwarded, or transmitted using any suitable means including memory sharing, message passing, token passing, network transmission, etc.

For a software implementation, the techniques described herein can be implemented with modules (e.g., procedures, functions, and so on) that perform the functions described herein. The software codes can be stored in memory units and executed by processors. The memory unit can be implemented within the processor or external to the processor, in which case it can be communicatively coupled to the processor via various means as is known in the art.

Figure 10:
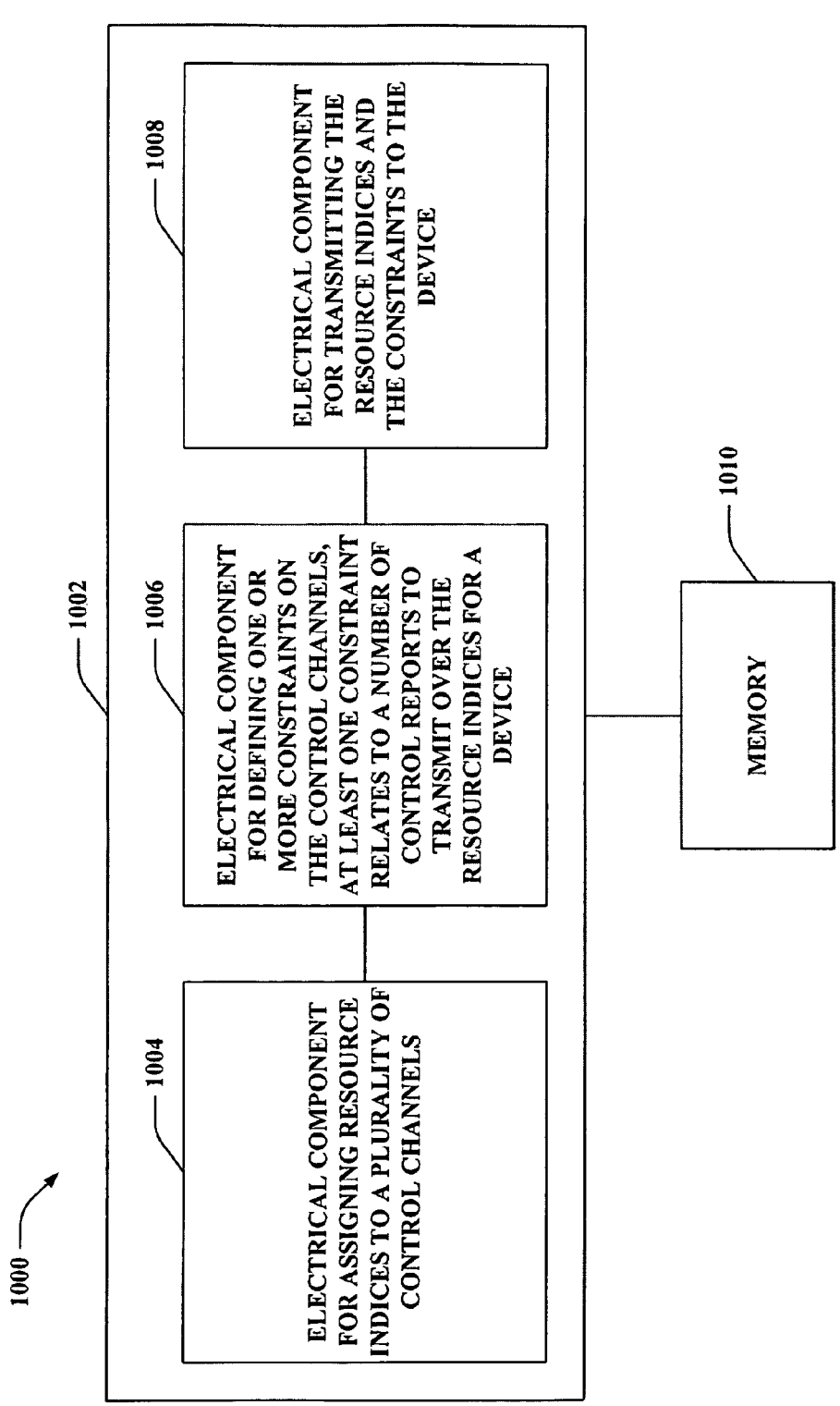
FIG. 10 is an illustration of an example system that creates constraints for control channels.

With reference to FIG. 10, illustrated is a system 1000 that defines one or more control channels and constraints related to utilizing the control channels. For example, system 1000 can reside at least partially within a base station, mobile device, etc. It is to be appreciated that system 1000 is represented as including functional blocks, which can be functional blocks that represent functions implemented by a processor, software, or combination thereof (e.g. firmware). System 1000 includes a logical grouping 1002 of electrical components that can act in conjunction. For instance, logical grouping 1002 can include an electrical component for assigning resource indices to a plurality of control channels 1004. For example, the resource indices can serve to identify the control channels. According to one example, the resource indices can apply throughout a frame period such that in a subsequent frame period, the numbers can be reused. Further, logical grouping 1002 can comprise an electrical component for defining one or more constraints on the control channels, at least one constraint relates to a number of control reports to transmit over the resource indices for a device 1006. For example, the constraint can relate to a minimum number of reports that need to be sent over the control channels, a maximum number of reports that can be sent, and/or an exact number of reports. Furthermore, the numbers and type can vary for different control data types or control channels as described above. Moreover, logical grouping 1002 can comprise an electrical component for transmitting the resource indices and the constraints to the device 1008. Thus, the device can utilize the constraints in transmitting control data to the wireless communications apparatus. Additionally, system 1000 can include a memory 1010 that retains instructions for executing functions associated with electrical components 1004, 1006, and 1008. While shown as being external to memory 1010, it is to be understood that one or more of electrical components 1004, 1006, and 1008 can exist within memory 1010.

Figure 11:
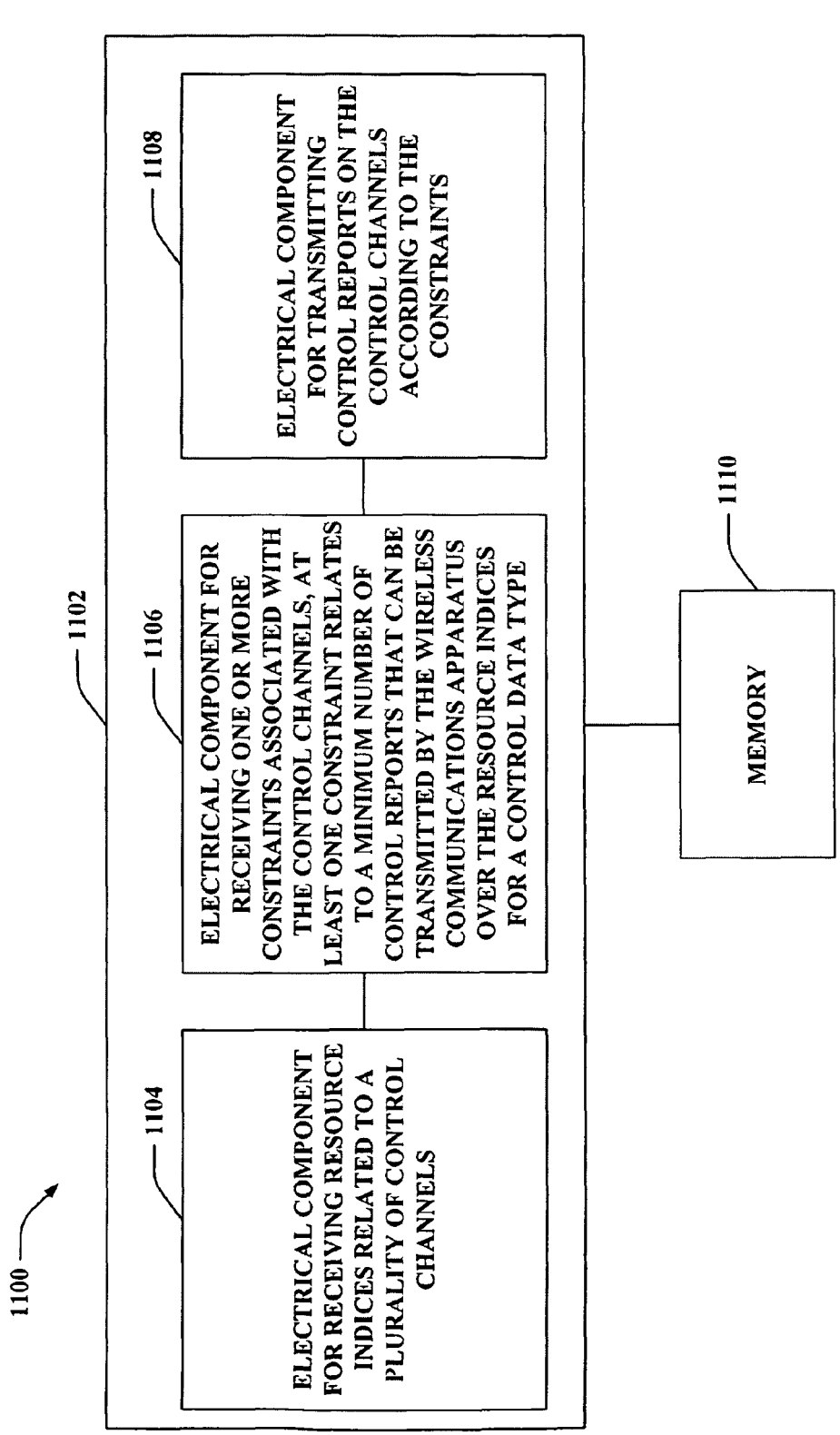
FIG. 11 is an illustration of an example system that utilizes control channels according to constraints.

Turning to FIG. 11, illustrated is a system 1100 transmits control data over one or more resource indices related to one or more control channels according to constraints on the control channels. System 1100 can reside within a base station, mobile device, etc., for instance. As depicted, system 1100 includes functional blocks that can represent functions implemented by a processor, software, or combination thereof (e.g., firmware). System 1100 includes a logical grouping 1102 of electrical components that facilitate transmitting the control data. Logical grouping 1102 can include an electrical component for receiving resource indices related to a plurality of control channels 1104. Thus, the device can utilize the indices to transmit control data over one or more control channels while adhering to the constraints of the channels. The constraints can relate to substantially any of those described herein. Moreover, logical grouping 1102 can include an electrical component for receiving one or more constraints associated with the control channels, at least one constraint relates to a minimum number of control reports that can be transmitted by the wireless communications apparatus over the resource indices for a control data type 1106. In this regard, constraints can be specific for given control types and/or reports, and a minimum number of control reports to transmit can be specified. This provides the device with flexibility regarding when to transmit control data. Further, logical grouping 1102 can comprise an electrical component for transmitting control reports on the control channels according to the constraints 1108. Therefore, the constraints can be implemented and utilized in the wireless communications network. Additionally, system 1100 can include a memory 1110 that retains instructions for executing functions associated with electrical components 1104, 1106, and 1108. While shown as being external to memory 1110, it is to be understood that electrical components 1104, 1106, and 1108 can exist within memory 1110.

What has been described above includes examples of one or more embodiments. It is, of course, not possible to describe every conceivable combination of components or methodologies for purposes of describing the aforementioned embodiments, but one of ordinary skill in the art may recognize that many further combinations and permutations of various embodiments are possible. Accordingly, the described embodiments are intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A method for specifying constraints on one or more control channels in a wireless communications network, comprising:
   defining one or more control channels on a portion of bandwidth;
   specifying a constraint related to a minimum number of control reports to be transmitted over the control channels for a device over the portion of bandwidth to provide flexibility with the device in determining when to transmit the control reports;
   specifying a constraint related to a minimum allowed change in payload from one control report to a subsequent control report; and
   transmitting the constraints to the device.

2. The method of claim 1, further comprising specifying a constraint related to a maximum number of control reports to be transmitted over the control channels for the device over the portion of bandwidth to prevent overloading the control channels.

3. The method of claim 2, wherein the maximum number constraint relates to out-of-band control reports and is based at least in part on a number of in-band control reports transmitted by the device.

4. The method of claim 2, further comprising decreasing the maximum number constraint over time to facilitate back-off for the device.

5. The method of claim 1, further comprising specifying a constraint related to an exact number of control reports to be transmitted over the control channels for the device over the portion of bandwidth.

6. The method of claim 5, further comprising calculating an erasure rate based at least in part on the exact number of control reports and a number of control reports received by the device for the frame period.

7. The method of claim 6, further comprising transmitting power signal commands to the device based at least in part on the erasure rate.

8. The method of claim 1, wherein the portion of bandwidth is defined by a period of physical frames.

9. A wireless communications apparatus, comprising:
   at least one processor configured to define one or more constraints related to a plurality of control channels in a portion of bandwidth, wherein at least one of the constraints specifies a maximum number of control reports to transmit over the control channels for a type of control data to provide flexibility in determining when to transmit the control reports and at least one of the constraints specifies a minimum allowed change in payload from one control report to a subsequent control report; and
   a memory coupled to the at least one processor.

10. The wireless communications apparatus of claim 9, wherein the maximum number of control reports computed for out-of-band reports is based at least in part on a previous number of in-band reports utilized in the portion of bandwidth.

11. The wireless communications apparatus of claim 9, wherein the at least one processor is further configured to specify a disparate constraint related to transmitting a disparate type of control data over the control channels.

12. The wireless communications apparatus of claim 9, wherein at least one of the constraints specifies a minimum number of control reports to transmit over the control channels for the type of control data.

13. The wireless communications apparatus of claim 9, at least one of the constraints specifies an exact number of control reports to transmit over the control channels for the type of control data.

14. The wireless communications apparatus of claim 13, the at least one processor further configured to determine an erasure rate based at least in part on the exact number of control reports and a number of control reports received from a device to which the constraints relate.

15. The wireless communications apparatus of claim 14, the at least one processor further configured to transmit power control signals to the device based at least in part on the determined erasure rate.

16. A wireless communications apparatus that specifies one or more constraints for a plurality of control channels, comprising:
   means for assigning resource indices to a plurality of control channels;
   means for defining one or more constraints on the control channels, wherein at least one constraint relates to a number of control reports to transmit over the resource indices for a device to provide flexibility with the device in determining when to transmit the control reports and at least one of the constraints relates to a minimum allowed change in payload from one control report to a subsequent control report; and means for transmitting the resource indices and the constraints to the device.

17. The wireless communications apparatus of claim 16, wherein the constraint relates to specifying a minimum number of control reports to transmit using the resource indices to promote flexibility in the device with respect to sending the control reports.

18. The wireless communications apparatus of claim 16, wherein the constraint relates to specifying a maximum number of control reports for the device to transmit using the resource indices to prevent overloading the control channels.

19. The wireless communications apparatus of claim 16, the constraint relates to specifying an exact number of control reports to transmit using the resource indices to facilitate determining an erasure rate for the device.

20. The wireless communications apparatus of claim 16, wherein the constraint relates to specifying specific requirements for transmitting control reports using certain resource entities.

21. The wireless communications apparatus of claim 16, wherein the constraints vary depending on a type of data to be transmitted over the control channels.

22. A non-transitory computer program product, comprising:
a non-transitory computer-readable medium comprising:
code for causing at least one computer to define one or more control channels on a portion of bandwidth;
code for causing the at least one computer to specify a constraint related to a minimum number of control reports to be transmitted over the control channels for a device over the portion of bandwidth to provide flexibility with the device in determining when to transmit the control reports;
code for causing the at least one computer to specify a constraint related to a minimum allowed change in payload from one control report to a subsequent control report; and
code for causing the at least one computer to transmit the constraints to the device.

23. The non-transitory computer program product of claim 22, further comprising code for causing the at least one computer to specify a constraint related to a maximum number of control reports to be transmitted over the control channels for the device in a frame period to prevent overloading the control channels.

24. A wireless communication apparatus, comprising:
a processor configured to:
assign resource indices to a plurality of control channels;
define one or more constraints on the control channels, wherein at least one constraint relates to a number of control reports to transmit over the control channels for a device to provide flexibility with the device in determining when to transmit the control reports and at least one of the constraints relates to a minimum allowed change in payload from one control report to a subsequent control report; and
transmit the resource indices and the constraints to the device; and
a memory coupled to the processor.

25. A method for transmitting control reports over control channels in a wireless communications network, comprising:
receiving resource indices related to one or more control channels;
receiving one or more constraints related to utilizing the resource indices, wherein at least one of the constraints is related to imposing a minimum number of control reports to be transmitted using the resource indices to provide flexibility in determining when to transmit the control reports and at least one of the constraints is related to a minimum allowed change in payload from one control report to a subsequent control report; and
transmitting one or more control reports according to the constraints.

26. The method of claim 25, wherein the transmitting one or more control reports is substantially equal to a minimum constraint to conserve power.

27. The method of claim 25, wherein at least one of the constraints is related to imposing a maximum number of control reports to be transmitted using the resource indices.

28. The method of claim 27, further comprising transmitting a number of in-band control reports, wherein the maximum constraint is based on the number of in-band reports transmitted.

29. The method of claim 25, at least one of the constraints is related to imposing an exact number of control reports to be transmitted using the resource indices.

30. A wireless communications apparatus, comprising:
at least one processor configured to receive resource indices that identify one or more control channels over a portion of bandwidth and constraints for using the control channels, wherein at least one constraint relates to a maximum number of control reports that can be sent on the control channels to provide flexibility in determining when to transmit the control reports and at least one of the constraints relates to a minimum allowed change in payload from one control report to a subsequent control report; and
a memory coupled to the at least one processor.

31. The wireless communications apparatus of claim 30, wherein the at least one processor is further configured to transmit in-band control data, and the maximum number of control reports constraint is related to the transmitted in-band control data.

32. The wireless communications apparatus of claim 30, wherein at least one constraint relates to a minimum number of control reports that can be sent on the control channels.

33. The wireless communications apparatus of claim 30, at least one constraint relates to an exact number of control reports that can be sent on the control channels.

34. A wireless communications apparatus for transmitting control data according to one or more constraints, comprising:
means for receiving resource indices related to a plurality of control channels;
means for receiving one or more constraints associated with the control channels, wherein at least one constraint relates to a minimum number of control reports that can be transmitted by the wireless communications apparatus over the resource indices for a control data type to provide flexibility in determining when to transmit the control reports and at least one of the constraints relates to a minimum allowed change in payload from one control report to a subsequent control report; and
means for transmitting control reports on the control channels according to the constraints.

35. The wireless communications apparatus of claim 34, wherein at least one of the constraints relates to a maximum number of control reports that can be transmitted by the wireless communications apparatus over the resource indices.

36. The wireless communications apparatus of claim 34, at least one of the constraints relates to an exact number of control reports that can be transmitted by the wireless communications apparatus over the resource indices.

37. The wireless communications apparatus of claim 34, wherein at least one of the constraints relates to specifying precisely which resource indices are to be used for a disparate control data type.

38. The wireless communications apparatus of claim 34, wherein the minimum number of control reports constraint reduces in a subsequent set of resource indices to provide back-off for the control channels.

39. A non-transitory computer program product, comprising:
    a non-transitory computer-readable medium comprising:
        code for causing at least one computer to receive resource indices related to one or more control channels;
        code for causing the at least one computer to receive one or more constraints related to utilizing the resource indices, wherein at least one of the constraints is related to imposing a minimum number of control reports to be transmitted using the resource indices to provide flexibility in determining when to transmit the control reports and at least one of the constraints is related to a minimum allowed change in payload from one control report to a subsequent control report; and
        code for causing the at least one computer to transmit one or more control reports according to the constraints.

40. The non-transitory computer program product of claim 39, wherein the transmitting one or more control reports is substantially equal to the minimum constraint to conserve power.

41. A wireless communication apparatus, comprising:
    a processor configured to:
        receive resource indices related to a plurality of control channels;
        receive one or more constraints associated with the control channels, wherein at least one constraints relates to a minimum number of control reports that can be transmitted by the wireless communications apparatus over the resource indices for a control data type to provide flexibility in determining when to transmit the control reports and at least one of the constraints relates to a minimum allowed change in payload from one control report to a subsequent control report; and
        transmit control reports on the control channels according to the constraints; and
    a memory coupled to the processor.

* * * * *